(12) United States Patent
Hauw et al.

(10) Patent No.: US 10,343,345 B2
(45) Date of Patent: Jul. 9, 2019

(54) METHOD AND DEVICE FOR APPLYING AN ADHESIVE TAPE ON A STIFFENER

(71) Applicant: Aerolia, Toulouse (FR)

(72) Inventors: Philippe Hauw, Sailly Laurette (FR); Vincent Marhem, Beaurains (FR)

(73) Assignee: AEROLIA, Toulouse (FR)

( * ) Notice: Subject to any disclaimer, the term of this patent is extended or adjusted under 35 U.S.C. 154(b) by 0 days.

(21) Appl. No.: 14/885,769

(22) Filed: Oct. 16, 2015

(65) Prior Publication Data

US 2016/0107374 A1 Apr. 21, 2016

(30) Foreign Application Priority Data

Oct. 16, 2014 (FR) ...................... 14 59942

(51) Int. Cl.
*B32B 41/00* (2006.01)
*B29C 65/00* (2006.01)
(Continued)

(52) U.S. Cl.
CPC .......... *B29C 66/0326* (2013.01); *B26D 5/007* (2013.01); *B26D 7/086* (2013.01); *B29C 65/5057* (2013.01); *B29C 65/5092* (2013.01); *B29C 66/0242* (2013.01); *B29C 66/112* (2013.01); *B29C 66/131* (2013.01); *B29C 66/301* (2013.01); *B29C 66/524* (2013.01);
(Continued)

(58) Field of Classification Search
CPC . B29C 66/0326; B29C 66/131; B29C 66/524; B29C 65/5092; B29C 66/301; B29C 66/112; B29C 65/1412; B29C 66/532; B29C 65/5057; B29C 66/95; B29C 66/9672; B29C 66/0242; B29C 66/721; B29C 63/003; B29C 66/61; B29C 66/91411; B29C 65/4835; B26D 5/007; B26C 7/086; B29K 2663/00; B29L 2031/3082
USPC .................. 156/64, 243, 350, 351, 378, 379
See application file for complete search history.

(56) References Cited

U.S. PATENT DOCUMENTS 2,650,185 A * 8/1953 Larson ....................... C09J 7/21
156/310
4,016,856 A * 4/1977 McLaughlin ...... B23D 57/0007
125/21
(Continued)

FOREIGN PATENT DOCUMENTS

| DE | 102006008455 A1 | 10/2007 |
| EP | 2749869 A1 | 7/2014 |
| FR | 2942741 A1 | 9/2010 |

*Primary Examiner* — Michael N Orlando
*Assistant Examiner* — Joshel Rivera
(74) *Attorney, Agent, or Firm* — Klein, O'Neill & Singh, LLP (57) ABSTRACT

The invention relates to a method for applying an adhesive tape on a flange of a stiffener, each flange extending longitudinally and including an outer profile, the method comprising a step for driving the stiffener from upstream to downstream along a circulation path; a step for measuring the outer profile of a portion of the flange of the stiffener in a first position of said circulation path; a step for applying said adhesive tape on the flange of the stiffener; then a step for cutting said adhesive tape, in a second position of said circulation path situated downstream from the first position, based on said measured outer profile.

17 Claims, 3 Drawing Sheets

(51) Int. Cl.

| | |
|---|---|
| *B29C 65/50* | (2006.01) |
| *B26D 5/00* | (2006.01) |
| *B26D 7/08* | (2006.01) |
| B29C 65/14 | (2006.01) |
| B29C 65/48 | (2006.01) |
| B29C 63/00 | (2006.01) |
| B29L 31/30 | (2006.01) |
| B29K 663/00 | (2006.01) |

(52) U.S. Cl.
CPC ............ *B29C 66/532* (2013.01); *B29C 66/95* (2013.01); *B29C 66/9672* (2013.01); *B29C 63/003* (2013.01); *B29C 65/1412* (2013.01); *B29C 65/4835* (2013.01); *B29C 66/61* (2013.01); *B29C 66/721* (2013.01); *B29C 66/91411* (2013.01); *B29K 2663/00* (2013.01); *B29L 2031/3082* (2013.01)

(56) References Cited

U.S. PATENT DOCUMENTS

| | | | |
|---|---|---|---|
| 5,320,461 A * | 6/1994 | Stanesic | B60R 11/00 24/289 |
| 5,954,917 A * | 9/1999 | Jackson | B29C 70/342 156/433 |
| 2005/0023728 A1* | 2/2005 | Benson | B29C 70/388 264/258 |
| 2014/0177936 A1* | 6/2014 | Toledano | B29C 70/38 382/141 |

\* cited by examiner

METHOD AND DEVICE FOR APPLYING AN ADHESIVE TAPE ON A STIFFENER

TECHNICAL FIELD AND PRIOR ART

The present invention relates to the manufacture of structural panels, in particular for an aircraft fuselage. The invention more particularly relates to the fastening of a plurality of stiffeners on a structural panel in order to form a so-called "self-stiffened" panel.

Traditionally, an aeronautics fuselage includes a plurality of structural panels made from composite material that are assembled together. Each structural panel comprises a planar or curved wall, which is generally thin and is known by those skilled in the art as "skin", and a plurality of structural stiffeners fastened on said wall so as to form a so-called "self-stiffened" panel that has high mechanical characteristics, in particular in terms of flexion, torsion and traction. Each stiffener extends substantially longitudinally and has an omega-shaped cross-section defining a central part with a concave shape and two lateral parts known by those skilled in the art as "flanges" or "bases".

In practice, during the assembly of a structural panel, the flanges of a stiffener are fastened on said wall using glue. To that end, a gluing method is implemented for the two flanges of each stiffener. In a known manner, after assembly, the wall and the glued stiffeners undergo a curing step in order to stiffen the assembly. The structural skin can next be connected to another panel in order to form a fuselage part of an aircraft.

Ordinarily, the gluing method comprises a step for manual application by an operator of an adhesive tape on each flange of the stiffeners. In a known manner, a protected adhesive tape comprises a double-sided adhesive film, a first face and a second face of said adhesive film respectively being protected by a first protective layer and a second protective layer. Such an adhesive tape is for example known under the trade name "FM300".

In order to apply said adhesive tape, the operator first removes the first protective layer in order to expose the first adhesive face of the adhesive tape and position it on a flange of the stiffener. After positioning, only the second protective layer of the adhesive tape is visible.

The gluing method further comprises a step for manually heating the second protective layer of the adhesive tape so as to increase the tack of the adhesive film in contact with said flange. In practice, the heating step is carried out by the operator using a device of the iron type that is placed in direct contact with the second protective layer of the adhesive tape.

Such a manual method has many drawbacks. First, the operator must position an adhesive tape manually on each flange of the stiffener. In order to ensure gluing of the stiffeners on the wall that meets the manufacturing requirements, it is necessary for the positioning to be precise, to within a millimeter. Such a positioning step is difficult and expensive to perform. Furthermore, the manual positioning of such an adhesive tape on a flange can generate creases, which is a drawback. Lastly, the positioning quality of an adhesive tape varies between different operators, which is another drawback.

The heating step also has drawbacks. In theory, the iron-type device must be moved by the operator over the second protective layer of the adhesive tape at a constant speed so as to heat the adhesive tape uniformly. In practice, the iron-type device is moved at a variable speed by the operator and the adhesive tape is heated non-uniformly. As a result, the adhesive tape has a heterogeneous tack, which can cause an adhesion flaw (excessively short heating time) or damage the adhesive tape (excessively long heating time).

Each fuselage panel having a three-dimensional shape, the stiffeners have different shapes and include geometric deformations of the "Deflection, Twist and Turn" type known by those skilled in the art.

As a result, the shapes of the flanges are different from one stiffener to another. Consequently, it is necessary to provide a collection of adhesive tapes to match the collection of flanges of the stiffeners. In other words, there are as many precut adhesive tapes as there are flanges. In practice, each adhesive tape must be custom-made, which is a drawback both in terms of cost and logistics. It is even more complex to manage the collection of adhesive tapes given that each stiffener includes two different flanges: a right flange and a left flange.

Thus, during the positioning of an adhesive tape on a flange of the stiffener, the operator must choose the adhesive tape corresponding to a predetermined flange of a specific stiffener. Next, the tape must be positioned with the correct orientation and with the correct face on said flange. Precautions must be taken in performing all of these operations to avoid any error, slowing down the gluing method.

Furthermore, due to manufacturing constraints, it is not possible to obtain a precut adhesive tape with a length exceeding 1 m in a single piece. Consequently, for a flange whose length can reach up to 4 m, the precut adhesive tape is delivered in the form of segments with a maximum length of 1 m. It is therefore necessary to apply several adjacent segments per flange, which has drawbacks in terms of logistics (larger number of references, etc.) and costs. In fact, precisely positioning the two adjacent segments is complex and time-consuming.

Lastly, the segments of adhesive tape are cut according to the theoretical dimensions of the flanges of the stiffeners. Therefore, in theory, the segments thus cannot correspond precisely to a predetermined flange. In practice, disparities appear in the dimensions of stiffeners within a same reference due to the manufacturing constraints of the stiffeners, which causes gluing flaws.

The invention therefore aims to resolve these drawbacks by proposing a method for applying an adhesive tape on a flange of a stiffener quickly, precisely and easily, in particular from a logistical perspective.

BRIEF DESCRIPTION OF THE INVENTION

To that end, the invention relates to a method for applying an adhesive tape on a flange of a stiffener, each flange extending longitudinally and including an outer profile, the method comprising:
  a step for driving the stiffener from upstream to downstream along a circulation path;
  a step for measuring the outer profile of a portion of the flange of the stiffener in a first position of said circulation path;
  a step for applying said adhesive tape on the flange of the stiffener; then
  a step for cutting said adhesive tape, in a second position of said circulation path situated downstream from the first position, based on said measured outer profile.

Owing to the method according to the invention, the application of an adhesive tape on the flange of a stiffener is automatic, which makes the application fast and repeatable.

Likewise, the application is precise and the risk of application error or flaw is eliminated, meeting manufacturing requirements.

The method being automatic, operator stress is reduced. Likewise, the application time is greatly reduced relative to a manual application. Lastly, the logistics are improved and the losses of adhesive tape are reduced owing to the cutting of a roll of adhesive tape. The application method is done continuously, i.e., without interruption, which saves time.

Preferably, the step for measuring the outer profile of a portion of the flange is carried out during the driving of the stiffener, which makes it possible to limit the length of the application method.

Preferably, the step for applying said adhesive tape on the flange of the stiffener is carried out during the driving of the stiffener. Thus, the application is automatic and the application time is reduced.

Preferably, the method according to the invention comprises a step for heating the flange of said stiffener, which makes it possible to improve the adhesion of the adhesive tape on the flange. Furthermore, the risk of damaging the adhesive tape is avoided.

Preferably, the step for cutting said adhesive tape is carried out during the driving of the stiffener. It is advantageously not necessary to provide a specific driving step for the cutting module.

The invention also relates to a method for applying an adhesive tape on a flange of a stiffener, each flange extending longitudinally, the method comprising:
  a step for driving the stiffener from upstream to downstream along a circulation path;
  a step for heating the flange of said stiffener; and
  a step for applying said adhesive tape on the flange of the stiffener according to a plurality of elementary bearing zones.

Thus, advantageously, the adhesive tape is pressed precisely on a flange in order to marry its geometric deformations. Furthermore, the heating step being carried out before the application step, there is no risk of damaging the flange.

The invention further relates to a device for applying an adhesive tape on a flange of a stiffener, each flange extending longitudinally and including an outer profile, the device comprising:
  a module for driving a stiffener from upstream to downstream along a circulation path;
  a module for measuring the outer profile of a portion of a flange of a stiffener in a first position of said circulation path;
  a module for applying an adhesive tape on a flange of a stiffener; and
  a module for cutting an adhesive tape, in a second position of said circulation path situated downstream from the first position, based on said measured outer profile.

Owing to the device according to the invention, the application of an adhesive tape on the flange of a stiffener is automatic, which makes the application fast and repeatable. Likewise, the application is precise and the risk of application error or flaw is eliminated, meeting manufacturing requirements.

The device being automatic, operator stress is reduced. Likewise, the application time is greatly reduced relative to a manual application.

Preferably, the measuring module comprises at least one profile acquisition system, advantageously contactless, of the camera or profilometer type. Of course, the profile acquisition system can also assume the form of a system with contact equipped with feelers. In the present case, the profile acquisition system includes a camera suitable for taking several photos of the flange in sequence, so as to monitor the profile of the flange of a stiffener when it is driven.

Preferably, the cutting module comprises at least one cutting wire, which allows precise and fast cutting while allowing various cutting angles. Preferably, the cutting wire is a diamond wire.

Advantageously, the cutting module is suitable for causing said cutting wire to vibrate, which makes it possible to increase the speed of advance of the cutting, i.e., the driving speed of the stiffener.

Preferably, the cutting module is configured to orient the cutting wire perpendicular to the surface of the adhesive tape to be cut. Thus, the cutting is more precise and makes it possible to marry any stiffener flange shape so as to remove adhesive tape scraps.

Preferably, the device comprises a management module configured to carry out a method for processing an image of the outer profile measured to determine a cutting outline. Thus, the cutting adapts automatically to the flange of the stiffener inserted into the application device.

The invention further relates to a device for applying an adhesive tape on a flange of a stiffener, each flange extending longitudinally, the device comprising:
  a module for driving a stiffener from upstream to downstream along a circulation path;
  a module for heating a stiffener flange; and
  a module for applying an adhesive tape on a flange of a stiffener, including a pressing member equipped with a plurality of elementary bearings.

BRIEF DESCRIPTION OF THE FIGURES

The invention will be better understood upon reading the following description, provided solely as an example and done in reference to the appended drawings, in which.

It should be noted that the figures describe the invention in detail to carry out the invention, said figures of course being able to be used to better define the invention if applicable.

DETAILED DESCRIPTION OF THE INVENTION

The invention will be described for the manufacture of a structural panel of an aircraft fuselage, but of course the invention applies generally to the manufacture of any structural panel.

Figure 1:
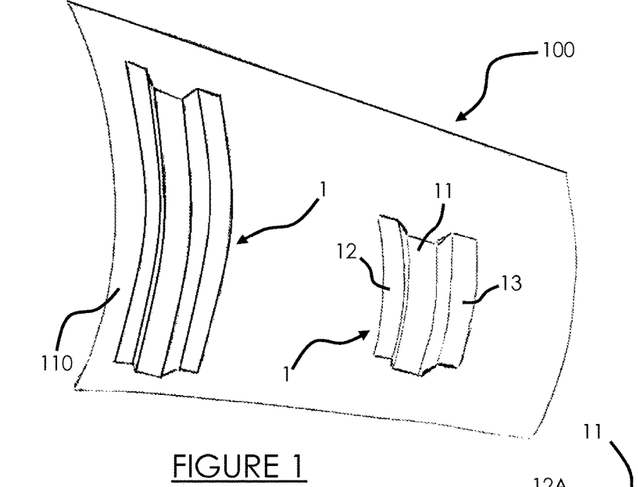
FIG. 1 is a diagrammatic illustration of a structural panel including a wall on which stiffeners are fastened.

In reference to FIG. 1, a structural panel 100 is diagrammatically shown that includes a curved wall 110, known by those skilled in the art as "skin", and a plurality of structural stiffeners 1 fastened on said curved wall 110 so as to form a so-called "self-stiffened" panel. Such a "self-stiffened"

panel has high mechanical characteristics, in particular in flexion, torsion and traction. The stiffeners 1 have a curved shape that is suitable for being fastened on the wall 110 of the structural panel 100.

Stiffener 1

Figure 2:
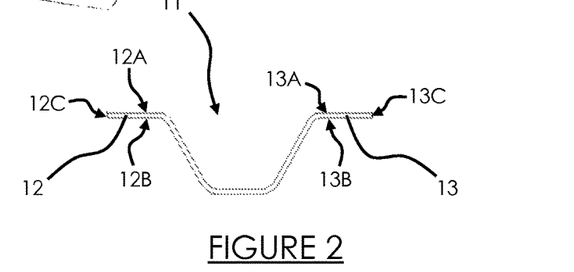
FIG. 2 is a diagrammatic illustration of the cross-section of a stiffener of the structural panel of FIG. 1.

As illustrated in FIGS. 1 and 2, each stiffener 1 extends substantially longitudinally and has an omega-shaped cross-section defining a central part 11 with a concave shape and two side parts 12, 13, known by those skilled in the art as "flanges", which are respectively designated hereinafter as "left flange 12" and "right flange 13" in reference to FIG. 1. During the assembly of a structural panel 100, the flanges 12, 13 of a stiffener 1 are fastened on said wall 110 using an adhesive tape that will be described later.

Each fuselage cell 100 having a three-dimensional shape, the stiffeners 1 have different shapes and include geometric deformations of the "Deflection, Twist and Turn" type known by those skilled in the art. As a result, the shapes of the flanges 12, 13 are different from one stiffener 1 to another. Furthermore, the stiffeners 1 generally have different lengths. Preferably, this length can vary between 30 cm and 4 m.

In reference to FIG. 2, each flange 12, 13 extends from the central part 11 of the stiffener 1 and to that end includes a first edge, called inner edge, connected to said cavity 11, and a second outer edge, called outer or free profile. As illustrated in FIG. 2, the left flange 12 includes an outer profile 12C, while the right flange 13 includes an outer profile 13C. Traditionally, the distance between the inner edge and the outer profile of a flange 12, 13 is less than 100 mm.

Still in reference to FIG. 2, each flange 12, 13 includes a first face 12A, 13A suitable for receiving an adhesive 2 (described below) and a second face 12B, 13B opposite the first face 12A, 13A.

Protected Adhesive Tape 20

Figure 3:
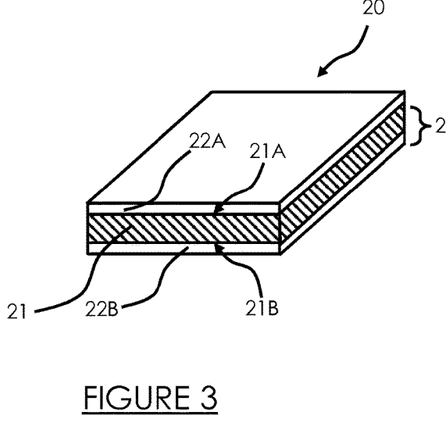
FIG. 3 is a sectional view of an adhesive tape for fastening a stiffener on a wall of a structural panel.

In reference to FIG. 3, a protected adhesive tape 20 comprises an adhesive film 21, of the double-sided type, that includes a first adhesive face 21A and a second adhesive face 21B. The adhesive faces 21A, 21B are respectively protected by a first protective film 22A and a second protective film 22B, which are removable. In this example, the protected adhesive tape 20 assumes the form of a roll known as "FM300" and which may reach a width of 130 mm.

In practice, the first protective film 22A is withdrawn so as to be able to expose the first adhesive face 21A and allow it to adhere to the first face 12A, 13A of the flange 12, 13. For concision and clarity reasons, the protected adhesive tape 20 stripped of its first protective film 22A is referred to hereinafter as "adhesive tape 2".

The second protective film 22B is removed during the assembly of the stiffener 1 to said wall 110 of the structural panel 100, i.e., after the stiffener 1 passes in the application device 3 according to the invention.

Figure 4:
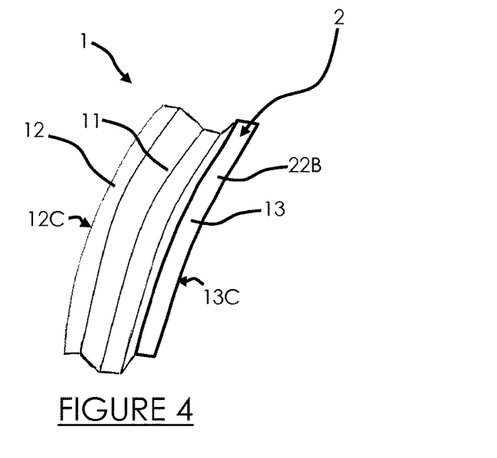
FIG. 4 is a diagrammatic view of a stiffener on which an adhesive tape is applied.

Below, a device according to the invention will be described for cutting and applying the adhesive tape 2 on a flange 12, 13 of the stiffener 1, as illustrated in FIG. 4.

Application Device 3

Figure 5:
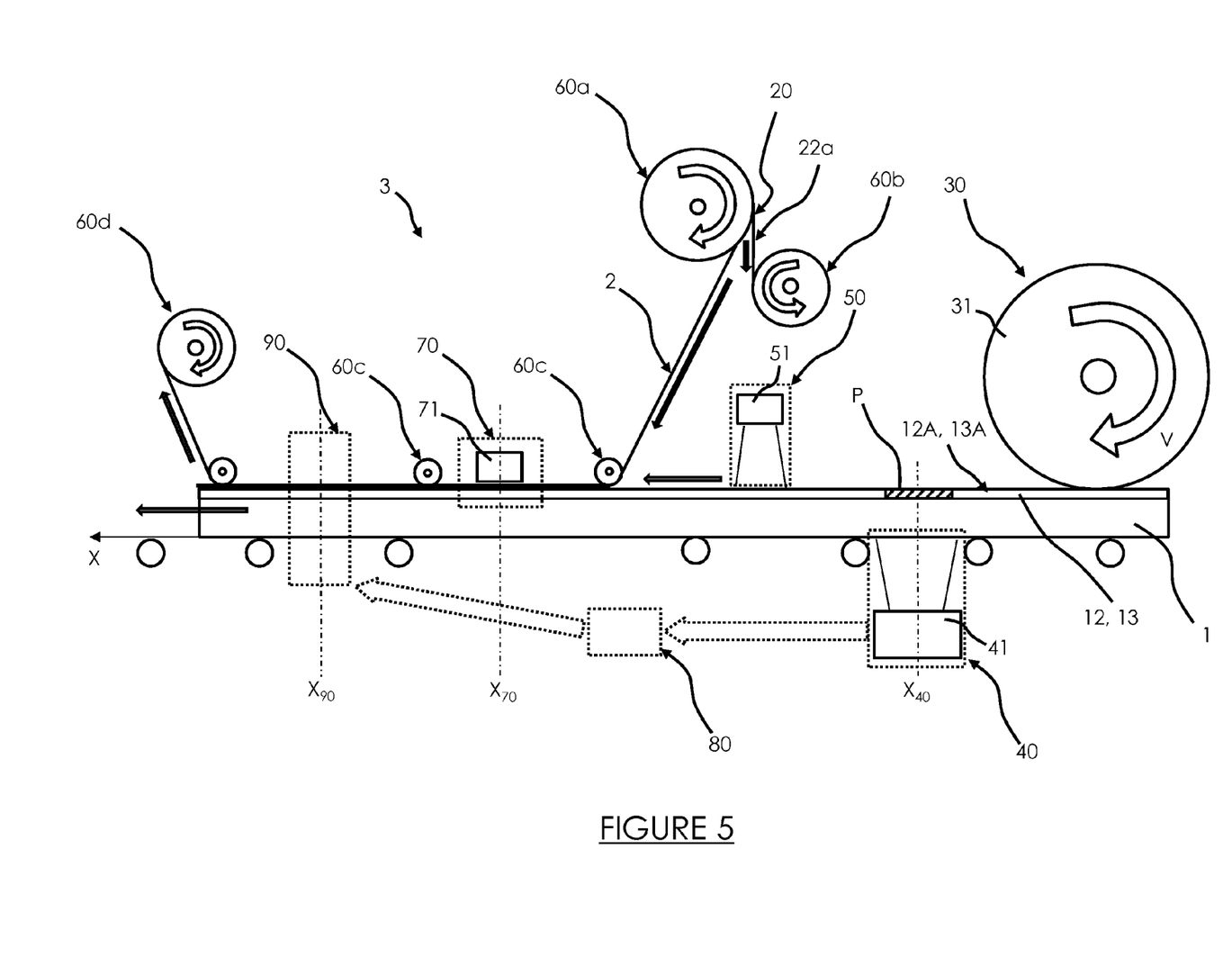
FIG. 5 is a diagrammatic view of a device for applying an adhesive tape on a stiffener according to the invention.

In reference to FIG. 5, an application device 3 is diagrammatically shown for applying the adhesive tape 2 on a single flange 12, 13 of a stiffener 1, in particular on its first face 12A, 13A. Nevertheless, the application device 3 could of course also position an adhesive tape 2 simultaneously on both flanges 12, 13 of a stiffener 1.

In this example, a method will be described for applying adhesive tape 2 on the right flange 13 of the stiffener 1.

The application device 3 includes a driving module 30 able to drive a stiffener 1 from upstream to downstream along a circulation path, a supply module 60 for supplying adhesive tape 2, a measuring module 40 for measuring the outer profile 13C of the flange 13 of the stiffener 1 so as to allow subsequent cutting of the adhesive tape 2, a heating module 50 for heating the stiffener 1 to improve the adhesion of the adhesive tape 2 on a flange 13, an application module 70 for applying adhesive tape 2 on the flange 13 of the stiffener 1, a cutting module 90 for cutting the adhesive tape 2 and a management module 80 able to control the cutting module 90 based on the outer profile 13C measured by the measuring module 40.

Each module of the application device 3 will henceforth be described in detail.

Driving Module 30

In reference to FIG. 5, the driving module 30 includes a planar driving surface, called circulation path, which extends from upstream to downstream along the axis X. Preferably, the planar driving surface includes rollers or similar members for limiting the friction during the movement of the stiffener 1.

The driving module 30 further includes one or more driving wheels 31, the rotation axis of which extends orthogonally to the circulation path and the outer periphery of which is configured to come into contact with the central part 11 of the stiffener 1. In this example, the stiffener 1 is driven "upside down" such that the first face 13A of the flange 13 is oriented upward, the driving wheel 31 coming into contact with the cavity of the central part 11 of the stiffener 1. In this example, the driving wheel 31 is motorized and has a constant rotation speed so as to obtain a driving or advance speed of approximately 10 to 50 mm/s.

Advantageously, each stiffener 1 is driven precisely on the circulation path so as to facilitate the heating, application and cutting of the adhesive tape 2 on the stiffener 1, as will be described below.

Supply Module 60

The supply module 60 makes it possible to distribute the adhesive tape 2 so that it is applied and cut during the driving of a stiffener 1. Furthermore, the supply module 60 makes it possible to collect the first protective film 22A of the protected adhesive tape 20 as well as the scraps related to the cutting. The supply module 60 further makes it possible to monitor the dispensing conditions of the adhesive tape 2, such as the speed and the tension.

In reference to FIG. 5, the supply module 60 includes a dispensing wheel 60a in which a roll of protected adhesive tape 20 is assembled and a collection wheel 60b connected to the first protective film 22A so as to expose the adhesive film 21 of the protected adhesive tape 20. As a reminder, the protected adhesive tape 20 stripped of its first protective film 22A is referred to hereinafter as "adhesive tape 2".

The supply module 60 further includes a plurality of guide wheels 60c to ensure the flatness of said adhesive tape 2 when it is applied on the flange 13. In practice, the guide wheels 60c guide the adhesive tape 2 substantially parallel to the circulation path of the stiffener 1 so as to facilitate a precise application of the adhesive tape 2 on the stiffener 1. The supply module 60 further includes a recovery wheel 60d suitable for collecting the scraps from the cutting of the adhesive tape 2. After the cutting of the adhesive tape 2, only part of the adhesive tape 2 remains applied on the stiffener 1, the other part of the tape 2, referred to as scrap 26, being collected by the supply module 60.

Heating Module 50

The heating module 50 of the stiffener 1 makes it possible to increase the adhesion of the adhesive tape 2 applied on the stiffener 1. In this example, the heating module 50 comprises a heating lamp 51, preferably of the infrared type, which is oriented substantially perpendicular to the circulation path like the flange 13 during its driving. Such heating is advantageous because a flange 13 is traditionally dark in color and therefore has high thermal inertia, which facilitates its adhesion with an adhesive tape 2. Nevertheless, the heating module 50 could of course also directly heat the first adhesive face 21A of the adhesive tape 2.

Preferably, the heating module 50 also comprises means for measuring the temperature of the flange 13 during its heating, preferably, without contact. In this example, the measuring means assume the form of an infrared pyrometer. Advantageously, the heating module 50 makes it possible to regulate the duration and the intensity of the heating based on the measured temperature. Such a heating module makes it possible to avoid an adhesion flaw of the adhesive tape 2 on the flange 13 (excessively short heating time) or damage to the adhesive tape (excessively long heating time).

Application Module 70

The application module 70 makes it possible to apply the adhesive tape 2 on the flange 13 of the stiffener 1 so that they adhere to one another. The application module 70 comprises a pressing member 71, in contact with the second protective film 22B of the adhesive tape, which is configured to constrain the adhesive tape 2 against the first face 13A of the flange 13. The first adhesive face 21A of the adhesive tape 2 is then glued on the first face 13A of the flange 13.

Preferably, the pressing member 71 includes a plurality of beads making it possible to react the shape irregularities of the flange 13. In other words, the pressing member 71 makes it possible to press the adhesive 2 in a plurality of elementary bearing zones against the flange 13.

Preferably, the beads are mounted on springs so as to move vertically and adapt to the curves of the flange 13. Thus, the application module 70 makes it possible to apply the adhesive tape 2 on the first face 13A of the flange 13 despite the geometric deformations of the flange 13.

In reference to FIG. 5, the application module 70 is situated in the longitudinal position $X_{70}$ on the circulation path.

Measuring Module 40

The measuring module 40 comprises at least one profile acquisition system, advantageously contactless, of the camera or profilometer type. Of course, the profile acquisition system can also assume the form of a profile acquisition system with contact, for example equipped with feelers.

In this example, the measuring module 40, illustrated in FIG. 5, comprises a video camera 41 suitable for capturing images of the flange 13 of the stiffener 1 and sending them to the management module 80, which will be described below. Preferably, the video camera 41 is situated below the circulation path and oriented perpendicularly upward so as to limit the bulk of the application device 3. Preferably, the video camera 41 is configured to measure the outside profile 13C of a portion P of the flange 13 during driving of the stiffener 1.

In reference to FIG. 5, the measuring module 40 is situated in the longitudinal position $X_{40}$ on the circulation path, upstream from the application module 70.

Cutting Module 90

The cutting module 90 makes it possible to cut the adhesive tape 2 applied on the flange 13 of the stiffener 1. To that end, the cutting module 90 comprises a cutting wire (not shown), in particular a cutting wire crimped with diamond beads, also called diamond wire, so as to allow clean cutting. Also preferably, the cutting module 90 is suitable for causing the cutting wire to vibrate so as to improve its cutting speed. A diamond wire set in vibration has an optimal cutting quality.

Preferably, the cutting module 90 is suitable for receiving a cutting outline and defining the movement of the cutting wire associated with said cutting outline. Consequently, the cutting module 90 comprises means for guiding two ends of the cutting wire so as to move it and orient it perpendicular to the circulation path of the stiffener 1, like a scroll saw.

Alternatively, the cutting module 90 could comprise an oscillating cutter, a stationary cutter, an ultrasound machine, a laser or a hot wire.

In reference to FIG. 5, the cutting module 90 is situated in the longitudinal position $X_{90}$ on the circulation path, downstream from the application module 70.

Management Module 80

The management module 80 in particular makes it possible to connect the measuring module 40 and the cutting module 90. The management module 80 comprises at least one computer for processing the images received from the measuring module 40. To that end, the computer implements an image processing method to compute a cutting outline from said images. In particular, the image processing method includes thresholding and filtering steps in order to determine the cutting outline 81 from the outside profile of a portion P of the flange 13 of the stiffener 1.

An image processing method has been described for generating a cutting outline, but of course the management module 80 is suitable for generating a cutting outline based on data from the measuring module (profilometer, feeler, etc.).

Implementation

In the following description, in reference to FIGS. 5 and 6, a method will be described for applying an adhesive tape 2 on the right flange 13 of the stiffener 1 using an application device 3 according to the invention. The application of the adhesive tape 2 on the left flange 12 is similar and will not be described, for concision reasons.

In this example, a roll of protected adhesive tape 20 is mounted in the supply module 60 and is ready to be applied. Advantageously, using a roll makes it possible to apply a same adhesive tape on several flanges with different shapes, as will be described later.

When the application device 3 is activated, the driving wheel 31 begins to move and waits for a stiffener 1 to be driven along the circulation path. An operator next inserts a stiffener 1 "upside down" at the inlet of the application device 3 by placing the first face 13B of the right flange 13 on the circulation path so that the driving wheel 31 comes into contact with the cavity of the central part 11 of the stiffener 1. The application method thus includes a step E1 for driving the stiffener 1 automatically at a driving speed V along the circulation path along the axis X as illustrated in FIG. 5.

The application method further includes a measuring step E2, in position $X_{40}$ of the circulation path, in which the camera 41 takes an image 42 of a first portion P of the right flange 13 of the stiffener 1 while the latter is driven on the circulation path. The camera 41 is oriented vertically to the circulation path and allow optimal viewing of the outer profile 13C of said first portion P. The viewing is even more precise when the right flange 13 has no adhesive tape 2. An image of each consecutive portion P of the right flange 13 is taken by said camera 41 in order to take images of the entire flange 13. For clarity and concision reasons, only the application of the adhesive 2 will be described for the first portion P, the application of the adhesive on the other portions being able to be deduced therefrom.

In reference to FIG. 6, the image 42, taken by said camera 41, is sent to the management module 80 so that the latter performs a processing step, as will be outlined below.

Figure 6:
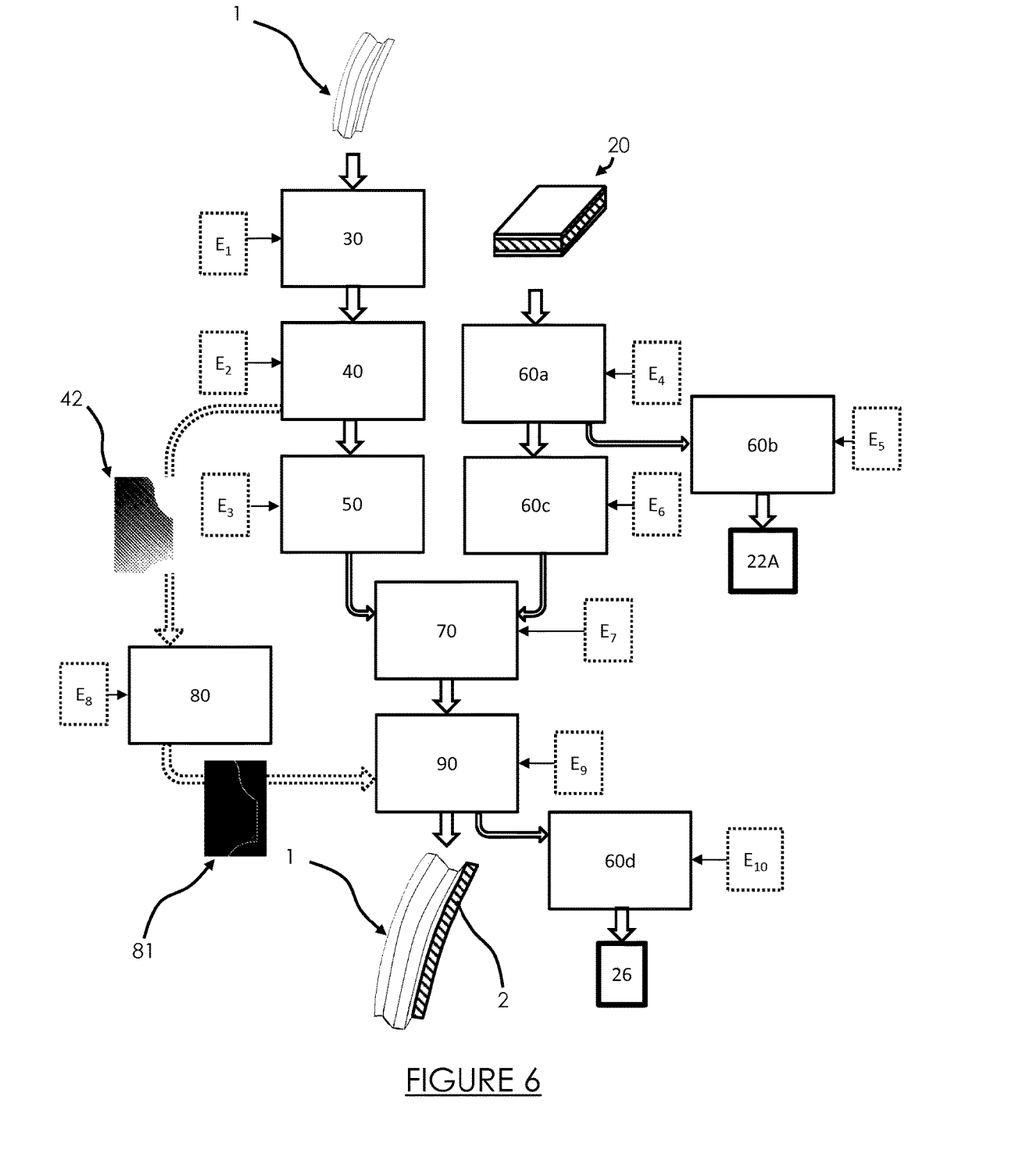
FIG. 6 is a diagrammatic flowchart of the implementation of a method for applying an adhesive tape on a stiffener according to the invention.

Still in reference to FIG. 6, the application method includes a heating step E3 for heating the stiffener 1 via the heating lamp 51 prior to the application of the adhesive 2. Such heating of the stiffener 1 makes it possible to ensure homogenous gluing without damaging the adhesive tape 2. Furthermore, the heating of the stiffener 1 is faster and less energy-consuming than heating of the adhesive tape 2 because of the better thermal inertia of the stiffener 1.

In parallel, the application method includes:
- a step E4 for dispensing adhesive tape 2, in which the dispensing wheel 60a is set in motion so as to unwind the protected adhesive tape 20,
- a step E5 for collection, by the collection wheel 60b, of the first protective film 22A so as to expose the first adhesive face 21A so that the latter is ready to be applied on the right flange 13 of the stiffener 1; and
- a step E6 for guiding the adhesive tape 2 via the guide wheels 60c parallel to the circulation path along the axis X, i.e., very substantially parallel to the first face 13A of the right flange 13.

Such steps for supplying adhesive tape 2 allow automatic manipulations of the adhesive tape 2, without risks for the operator.

In order to connect the adhesive 2 to the right flange 13 of the stiffener 1, the application method includes an application step E7 in which a portion of the adhesive tape 2, guided between two guide wheels 60C substantially parallel to the circulation path, is applied on the first face 13A of the portion P of the right flange 13 by the pressing member 71. Preferably, the adhesive tape 2 is driven at a driving speed substantially equal to that of the right flange 13, given that it is glued to the latter.

The beads mounted on springs of the pressing member 71 make it possible to react the shape irregularities of the right flange 13. In other words, the pressing cylinder 71 makes it possible to ensure local flatness of the adhesive tape 2 on the first face 13A of the right flange 13. Such an application method advantageously makes it possible to apply the adhesive tape 2 without creases despite the shape irregularities of the right flange 13.

Parallel to the application step E7, the application step implements a processing step E8 in which the computer of the management module 80 implements an image processing method to compute a cutting outline 81 from the image 42 sent by the camera 41. The management module 80 next sends the cutting outline 81 to the cutting module 90. In practice, the processing step E8 to obtain a cutting outline 81 is relatively long. Advantageously, the processing step E8 is done in parallel with the application step E7 so that the latter is done during hidden time. Advantageously, the application method can thus be done continuously, without interruption.

In position $X_{90}$ of the circulation path, the application method includes a cutting step E9 of the adhesive tape 2 applied on the first portion P of the flange 13. The cutting wire follows the cutting outline 81 sent back by the management module 80 so as to cut the adhesive tape 2 according to the profile 13C of the portion P of the right flange 13.

Such a cutting step of the adhesive tape 2 after application of said tape 2 on the flange 13 ensures precise positioning of the adhesive tape 2 on the flange 13 and uninterrupted custom cutting. The cutting of the adhesive tape 2 corresponding to the profile 13C previously measured ensures a complete match between the cutting profile of the adhesive tape 2 and the outer profile 13C of the right flange 13, irrespective of the machining allowances of the right flange 13.

In order to ensure that the cutting step E9 is carried out when the first portion P of the right flange 13 is an axial position $X_{90}$, this step is carried out after a predetermined time T and following the measuring step E2, the predetermined time T depending on the driving speed V and the distance between the downstream position $X_{90}$ and the upstream position $X_{40}$.

In practice, the cutting outline is first computed in a measurement plane of reference of the measuring module 40, then converted into a cutting plane of reference of the cutting module 90. Owing to this change in plane of reference, the position of each portion of the right flange 13 is completely determined.

Following the cutting step E9, part of the adhesive tape 2 remains applied on the stiffener 1, while the other part of the adhesive tape 2, referred to as scrap 26, remains free. The application method includes a collection step E10 in which the recovery wheel 60d is set in motion so as to wind the scraps 26 and form a scrap roll.

At the output of the application device 3, the stiffener 1 is recovered by an operator, the stiffener 1 having its right flange 13 covered with a custom adhesive 2. In order to apply an adhesive 2 on the left flange 12 of the stiffener 1, the operator need only place the stiffener 1 at the input of the application device 3 with a different orientation. Preferably, two application devices according to the invention are mounted in series so as each to apply an adhesive tape 2 on a flange of the stiffener 1. Thus, advantageously, it is no longer necessary for the operator to manipulate a stiffener 1 whose length may be approximately 4 m.

In order to mount the stiffener 1 on a structural panel, it suffices for the operator to remove, preferably manually, the second protective film 22B from each adhesive 2 before applying the exposed faces against said structural panel.

Owing to the invention, the automatic application device 3 allows a homogenous and repeatable application of an adhesive tape 2 on a stiffener 1. Furthermore, the application time is considerably reduced relative to a manual application, which is advantageous for industrial implementation. Furthermore, the risk of application error or flaw is eliminated. The use of a roll of adhesive tape 2 instead of precut adhesive segments improves logistics and decreases losses. Lastly, operator stress is decreased.

The invention claimed is:

1. A method for applying an adhesive tape on a flange of a ready to use stiffener, the flange extending longitudinally and including an outer profile and a first face to be fastened to a panel, the adhesive tape comprising a first adhesive face and a second adhesive face which are respectively protected by a first protective film and a second protective film, the method comprising:
   driving the stiffener from an upstream position to a downstream position along a circulation path;
   measuring the outer profile of a portion of the flange of the stiffener in a first position of said circulation path;
   collecting the first protective film of said adhesive tape so as to expose the first adhesive face;
   applying said first adhesive face on the first face of the flange of the ready to use stiffener as the ready to use stiffener is driven between the first position and a second position of said circulation path; and
   cutting said adhesive tape according to a cutting profile, in the second position of said circulation path situated downstream from the first position, based on said measured outer profile so as to ensure a match between the cutting profile of the adhesive tape and the outer profile of the flange, the second protective film protecting the second adhesive face of the adhesive tape.

2. The method according to claim 1, wherein measuring of the outer profile of the portion of the flange is carried out during the driving of the stiffener.

3. The method according to claim 1, further comprising heating the flange of said stiffener.

4. The method according to claim 1, wherein the cutting of said adhesive tape is carried out during the driving of the stiffener.

5. A device for applying an adhesive tape on a flange of a ready to use stiffener, the adhesive tape comprising a first adhesive face and a second adhesive face which are respectively protected by a first protective film and a second protective film, the flange extending longitudinally and including an outer profile and a first face to be fastened to a panel, the device comprising:
- a module for driving a ready to use stiffener from an upstream position to a downstream position along a circulation path;
- a module for measuring the outer profile of a portion of a flange of the ready to use stiffener in a first position of said circulation path;
- a module for collecting the first protective film of said adhesive tape so as to expose the first adhesive face;
- a module for applying said first adhesive face on the first face of the flange of the ready to use stiffener between the first position and a second position in said circulation path; and
- a module for cutting an adhesive tape according to a cutting profile, in the second position of said circulation path situated downstream from the first position, based on said measured outer profile so as to ensure a match between the cutting profile of the adhesive tape and the outer profile of the flange, the second protective film protecting the second adhesive face of the adhesive tape.

6. The device according to claim 5, wherein the measuring module comprises at least one video camera.

7. The device according to claim 5, wherein the cutting module comprises at least one cutting wire.

8. The device according to claim 7, wherein the cutting module is suitable for vibrating the at least one cutting wire.

9. The device according to claim 7, wherein the cutting module is configured to orient the at least one cutting wire perpendicular to the surface of the adhesive tape to be cut.

10. The device according to claim 5, including a management module configured to carry out a method for processing an image of the outer profile measured to determine a cutting outline.

11. The device according to claim 7, wherein the at least one cutting wire is a diamond wire.

12. The device according to claim 5, further comprising a stiffener having a first flange and a second flange extending from a central part opposite one another.

13. The device according to claim 12, wherein a planar surface defines the circulation path and wherein the stiffener is positioned on the planar surface so that at least one of the first and second flanges is contacted by the module for driving.

14. The device according to claim 13, wherein the first flange and the second flange each comprises a surface contour and wherein the module for applying an adhesive tape comprises a pressing member comprising a plurality of beads that are movable to adapt to the surface contour at least one of the first and second flanges.

15. The method according to claim 1, wherein the flange is a first flange and wherein the stiffener comprises a second flange extending from a central part opposite the first flange.

16. The method according to claim 15, wherein the stiffener is driven by one or more driving wheels.

17. The method according to claim 16, wherein a planar surface defines the circulation path and wherein the stiffener is placed on the planar surface so that the first flange and the second flange are contacted by the one or more driving wheels.

* * * * *